Aug. 11, 1953  C. G. GASE  2,648,138
CLEARANCE ANGLE GAUGE
Filed Nov. 7, 1947  2 Sheets-Sheet 1

INVENTOR.
CARL G. GASE
BY
Hoodling and Krost
attys.

Aug. 11, 1953    C. G. GASE    2,648,138
CLEARANCE ANGLE GAUGE
Filed Nov. 7, 1947    2 Sheets-Sheet 2

INVENTOR.
CARL G. GASE
BY Hoodling and Kraat attys

Patented Aug. 11, 1953

2,648,138

UNITED STATES PATENT OFFICE 2,648,138

CLEARANCE ANGLE GAUGE

Carl G. Gase, Macedonia, Ohio, assignor to The Weldon Tool Company, a corporation of Ohio Application November 7, 1947, Serial No. 784,543

1 Claim. (Cl. 33—201)

The invention relates to tool gauges having a fixed mount to hold the piece to be gauged.

An object of the invention is to accurately gauge the critical back-off clearances for the cutting edge of a cutting tool.

Another object of the invention is to provide a gauge which may be accurately positioned relative to a tool edge to be gauged, and the measurement multiplied for easy reading.

A still further object of the invention is to provide a gauge to gauge the clearance angle or angularity of the surface which defines the back-off clearance for the cutting edge of a cutting tool.

Other objects and a fuller understanding of the invention may be had by referring to the following description and claim, taken in conjunction with the accompanying drawing, in which:

It is difficult to check spiral work and very narrow back-off angles, which are necessary on small diameters. Prior to this invention, however, there has been no practical means to determine the clearance angle accurately, because of the extremely small dimensions.

Figures 1, 2:
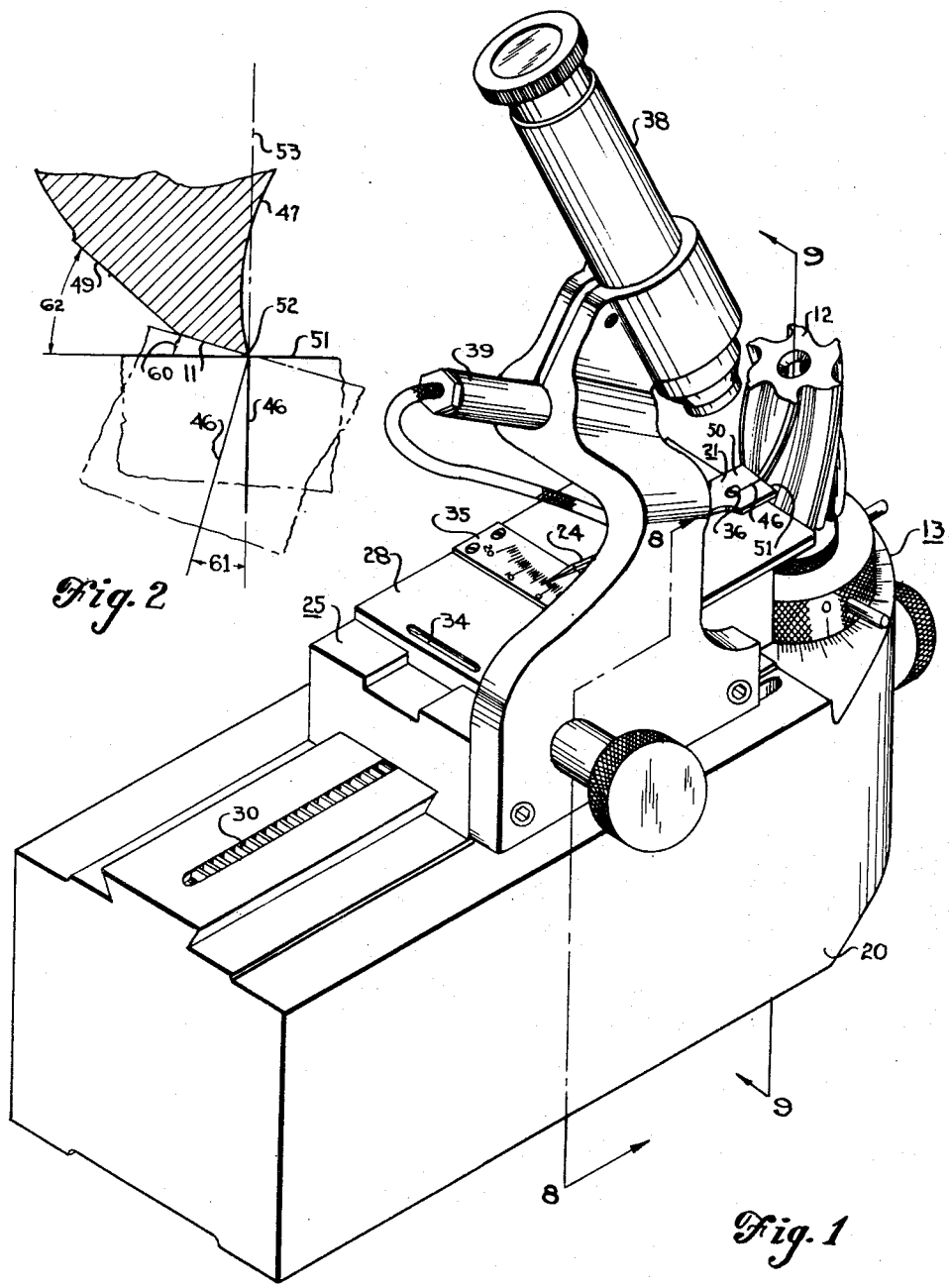
Figure 1 is a perspective view of the gauge.
Figure 2 is an enlarged view of a flute and cutting edge of an end mill with the gauging contact face of the gauge member in contact therewith.

The double back-off of a tool which may be gauged by this tool gauge is best illustrated in Figure 2 of the drawings. The double back-off consists of a first back-off surface 11 extending from the cutting edge 52 rearwardly at a slight angle relative to the radius of the tool, and a second back-off surface 49 extending at a greater angle relative to the radius of the tool. To the naked eye, the back-off surface 11 is too small to discern the width thereof, let alone measure the angle thereof. For example, in a one inch end mill, the back-off surface 11 extends at an 8° angle with respect to a radius of the tool, and is .018 inch wide. Although it is desirable to have the back-off surface 49 held within reasonable limits, the angle of the back-off surface 11 relative to a radial line of the tool passing through the cutting edge 52 is highly critical and is the determining factor for the amount of work which the tool will accommodate. Also in Figure 2 the undercut side 47 of the individual cutting flute may be seen.

It is often the case in the early development of a particular art or science, that certain developments are known to contribute to the worthiness of the science, but often it is not realized at first how extremely critical the limits imposed upon the use must be. Back-off clearances have been used in all types of cutting tools, including the end mill type of tool. It has only recently been discovered that the angle of the first back-off clearance extending from the cutting edge is highly critical, and that if this angle is held exactly to the correct exact small fraction of a degree, that the production of the tool will be increased 50 per cent or more over the production ability when the first back-off clearance is allowed to vary even a fraction of a degree away from the optimum angle for the given tool. Further, various angles have been found to produce optimum results for various metals. In some instances the best angle is found by test experience. When once the best clearance angle has been found, it is essential to provide that exact angle on tools produced thereafter, and with this gauge, it is possible to repeat the best clearance found by experience. Many reasons may be attributed for this phenomenal increase in cutting ability due to the exact back-off clearance, but the fact remains that regardless of theory the increase in production can readily be determined by actual shop practice, and in fact has been proven many times over in shop practice.

Of course, an angle that is so critical cannot be ground freehand. Grinding machinery must be employed, and even the results of the machine must be closely observed in order to dress the grinding stone and adjust the machine in order to keep the angle perfect. Prior to the development of the present invention, the development of a perfect back-off clearance has been dependent upon the skill of the craftsman grinding the cutting flute and back-off clearances, or has been left to mere chance because of a lack of the understanding of the necessity for obtaining such close accuracy in the back-off clearance angle.

This invention will gauge the angle of the back-off surfaces relative to the radius of the tool with an accuracy well within the limits of accuracy permissible. In the Figure 1 of the drawing, the gauge for the clearance angle of the back-off surface of a tool is illustrated in perspective in order to show the relationship of the various parts. In the Figure 1, the reference character 20 illustrates a bed or base for the gauge. It is desirable that the bed 20 be rather heavy in order that the gauge will not easily move and therefore require the operator to hold the device while in use.

Figure 8:
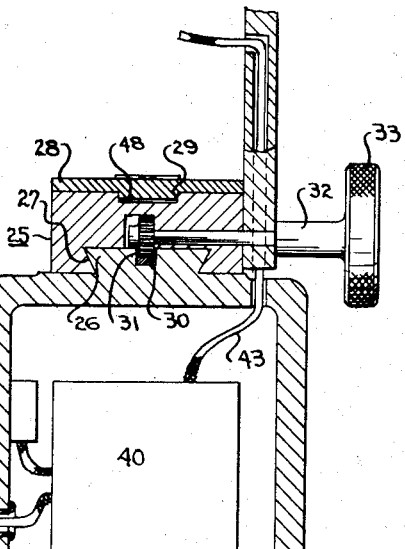
Figure 8 is a sectional view as indicated by line 8—8 of Figure 1.

The Figure 8 is a sectional view through the Figure 1 as indicated by the line 8—8 of Figure 1, and illustrates the construction of several of the cooperating parts. In the Figure 8, it will be seen that a dovetail way 26 is provided on top of the bed 20. A carriage 25 including a dovetail 27 and a slide 28 is mounted to reciprocate longitudinally relative to the bed 20. In the particular adaptation of the invention as illustrated, a rack 30 extends longitudinally of the dovetail way 26. A rod 32 is carried by the carriage 25, and is provided with a pinion gear 31 adapted to operate with interlocking teeth with the rack 30. A knob 33 is secured to the end of the rod 32 and serves as a finger grip to rotate the rod 32 and the pinion gear 31. The carriage 25 may thereby be actuated longitudinally in a forwardly or rearwardly direction by turning the knob 33 in the direction in which it is desired to move the carriage 25. The carriage 25 is provided with a way 29 in the form of a longitudinal groove. The slide 28 is provided with a longitudinal ridge 48 complementary to the way 29 which is adapted to guide the slide 28 for longitudinal movement relative to the dovetail 27. Thus, the carriage 25 may be actuated to a desired position, and the slide thereafter moved relative to the carriage 25 for further longitudinal adjustment. In other words, the adjusting knob 33 is used for rough adjustments in order to accommodate various sizes of tools, and the slide 28 thereafter used for fine adjustments relative to the cutting edge of the tool.

Figure 9:
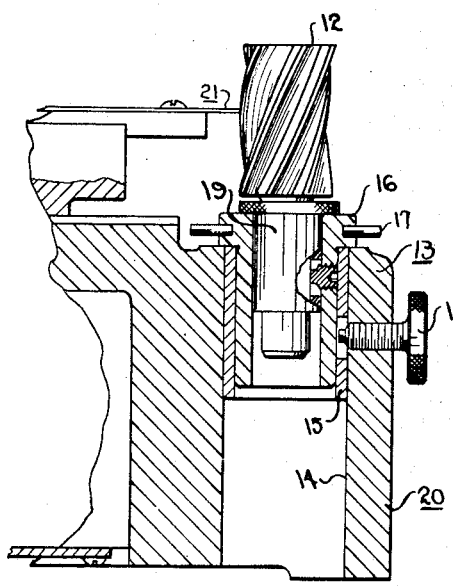
Figure 9 is a sectional view as indicated by line 9—9 of Figure 1.

In Figure 9 of the drawings, a cross-sectional view of the tool mount 13 of the gauge is illustrated and includes a vertical bore 14 in the bed 20. A guide bearing 15 is held in the upper portion of the bore 14. A mounting insert 16 is adapted to closely interfit with the internal surface of the guide bearing 15, and is adapted to hold a bushing 19 therein. Grip prongs 17 extend radially about the upper portion of the mounting insert 16 and are used as finger grips to turn the mounting insert 16 in the guide bearing 15. A lock screw 18 is provided to extend through the guide bearing 15 and hold the mounting insert 16 in a selected position. The bushing 19 has an outside diameter to fit the internal diameter of the mounting insert 16, and has an internal diameter to fit the shank of a tool 12. In other words, the bushing 19 compensates for various sizes of shanks. In some instances the tool 12 may have a shank large enough to fit directly into the internal diameter of the mounting insert 16, and therefore the bushing 19 would not be required. In most instances, however, a bushing 19 will be required to hold the tool 12 in the mounting insert 16. Thus, the tool 12 may be rotated about its longitudinal axis with the axis extending in one direction, and the slide 28 will be longitudinally reciprocable in a second direction at an angle to the direction in which the tool extends.

Figure 6:
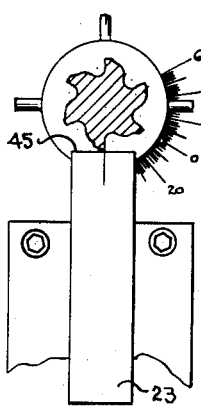
Figure 6 is yet another alternate type of gauge member and scale aligned with the work piece.
Figure 7:
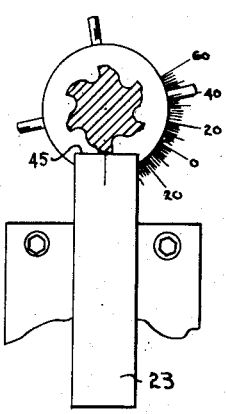
Figure 7 is a view similar to Figure 6 with the work piece rotated to contact the surface to be gauged with the gauge member.

The carriage 25 serves as a positioning means to mount a gauge member for longitudinal reciprocation in the second direction at an angle to the direction in which the tool extends. In the Figures 1, 3 and 4, a gauge member 21 is illustrated, and in Figure 5 of the drawings an alternate type gauge member 22 is illustrated. The Figures 6 and 7 illustrate the third type of gauge member 23 and the use thereof.

In the Figure 1, it will be seen that the gauge member 21 includes a gauge body 50 having a gauging contact face 51 and a pointer arm 24. A scale 35 is attached to the surface of the slide 28, and serves to indicate the change of position of the pointer arm relative to the scale. The gauge member 21 is pivoted to the surface of the slide 28 by a pivot 36 in the form of a screw or rivet. The pivot 36 is positioned on the slide 28 to lie on a line extending from the longitudinal axis of the tool 12 to a point on the scale 35. (See centerline 53 in Figure 2.) In other words, if a line were extended from a point on the scale 35 (and normally that point would be the zero point in the center of a scale), to the longitudinal axis of the workpiece 12, the line would constitute a radius of the tool, and the pivot 36 would lie exactly on that line. Thus, the zero mark on the scale 35 and the pivot 36 which serves as a pivotal mounting means for the gauge member, define a straight line passing through the longitudinal axis of the tool 12. Furthermore, the gauging contact face 51 in the preferred embodiment of the invention is perpendicular to the longitudinal axis of the pointer arm 24. Therefore, the longitudinal axis of the pointer arm 24 may be aligned to extend coextensively with the radial line from the zero mark of the scale through the longitudinal axis of rotation of the tool 12. In the Figure 1, and in the Figure 2, a hairline 46 is marked upon the surface of the gauge body 50. This visual hairline 46 is employed as an indicator to align the cutting edge of the tool 12 with the line 53 extending from the zero mark on the scale 35 to the longitudinal axis of the tool 12.

Figure 3:
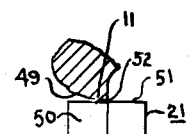
Figure 3 is a diagrammatic illustration of the scale and gauge member, aligned with the axis of the tool to be gauged.
Figure 4:
Figure 4 is a view similar to Figure 3 with the gauge member in contact with the surface to be gauged, the back-off surfaces being exaggerated for illustration.

To operate the preferred embodiment of the invention in the form illustrated in Figure 1 of the drawings, the tool 12 is mounted concentrically in the tool mount 13 illustrated in Figure 9. The longitudinal axis of the tool 12 and the axis of rotation produced by the mount 13 should be identical. That is, the tool 12 is mounted to rotate about its longitudinal axis. The gauge member 21 is then pivoted to place the end of the pointer arm 24 exactly on the zero position of the scale 35. Thus, the gauging contact face 51 will be positioned perpendicular to a radial line of the tool 12. The carriage 25 is then moved to within a relatively close distance of the tool 12 by turning the knob 33 and actuating the carriage 25 toward the tool 12. Thereafter, the slide 28 is manually adjusted relative to the tool 12 to complete the gauging action. A finger-grip portion 34 on the slide 28 is provided to aid in the manual adjustment of the slide 28. The gauging contact face 51 is brought close to the cutting edge 52 of the tool 12, and the tool 12 is rotated in the tool mount 13 to position the cutting edge 52 into exact alignment with the hairline 46, as best illustrated in Figure 3. In other words, the zero mark, the pivot 36, and the cutting edge 52 are all aligned on the radius line 53 of the tool 12.

After the tool and gauging member 21 are perfectly aligned as illustrated by the full lines of Figure 2, the gauge member 21 is pivoted to place the gauging contact face 51 into contact with the back-off surface 11 as indicated by the dotted lines in Figure 2. The angle of the surface 11 to be measured is the angle between the perpendicular to the radius of the tool extending through the cutting edge, and the back-off surface 11. It will clearly be seen that this angle is represented by the angle 60 of Figure 2. The second back-off angle is indicated by reference character 62. Therefore, when the gauge member 21 is pivoted and longitudinally repositioned to place the gauging contact face 51 into contact with the back-off surface 11, the angle 61 between the original setting of the pointer arm 24 and the final position of the pointer arm 24 will represent the angle 60 which is to be measured. The angle 61 may be determined directly from the scale 35. Of course, the arm 24 magnifies the angle many times, and therefore is easily determined from the scale.

As before indicated, the angle 60 is extremely critical and therefore must be provided within close limits if optimum results are to be obtained from the tool. These angles have been determined for a particular size and type of tool. Therefore, after the back-off clearances 11 on each of the flutes have been ground, they are measured by the process steps which have been described, and if the angle 60 is correct, the tool is passed on for use, but if the angle 60 is incorrect, the grinding operation is repeated until it is brought within close limits.

The land width of the back-off surface is quite small. Therefore, it is virtually impossible to produce a correct positioning between the gauge member 21 and the back-off surface with the naked eye. Accordingly, I have provided a magnifying eye-piece 38 positioned at an angle to the axis of the tool, and a spotlight 39 to light the area under observation, which when magnified will appear enlarged as illustrated in Figure 2. The angular position of the eye-piece 38 permits inspection of the gauging of spiral flutes. A spiral flute would interfere with top observation. A transformer 40 is located within the bed 20 and current is carried from the transformer 40 to the spotlight 39 by means of a suitable wire 43. Thus, a bright, small spotlight may be provided to illuminate the gauging area, and the clearance surface 11 and gauging contact face 51 will be enlarged. An inlet plug 41 is provided on the side of the bed 20 for convenience in attaching the gauge to any suitable outlet, and a switch 42 is adapted to connect and disconnect the transformer 40. By these useful additions to the gauge, the operator may align the cutting edge 52 exactly with the hairline 46, and will be able to position the gauging contact face 51 in full contact with the back-off surface 11. Accordingly, by the magnification of the gauging process, the limits of inaccuracy are held extremely low.

Figure 5:
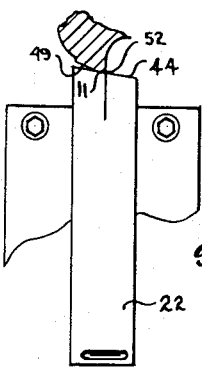
Figure 5 is an alternate type of gauge member.

In the Figure 5, I illustrate a gauge member 22 having a fixed gauging contact face 44. The gauge member 22 is adapted to operate in the way 29 on the carriage 25 in place of the slide 28. By this method, the gauging contact face 44 may be provided at exactly the angle desired. Therefore, by moving the gauge member 22 into contact with the back-off surface 11, and by placing the cutting edge directly in contact with the hairline on the gauge member 22, the operator can tell immediately whether the back-off surface 11 has been ground at too great or too small an angle, or if the angle is exactly correct. Of course, by this method of gauging, the operator cannot tell exactly what the angle of the back-off surface 11 actually is, but he can tell whether or not it is correct as he desires it.

In the Figures 6 and 7, a third method of employing the basic conception of the invention is illustrated. In the embodiment illustrated therein, the mounting insert 16 is provided with a convenient marker on the side thereof as indicated, and a rotary gauge on the surface of the bed 20 is provided around the mounting insert 16. Therefore, the tool may be rotated and the radial movement indicated by the scale and marker. A gauge member 23 is employed with this method of gauging, and is adapted to move in the way 29 in place of the slide 28. However, the gauge member 23 is provided with a gauging contact face 45 at a 90-degree angle relative to the radius of the tool, and the longitudinal axis of the gauge member 23. Therefore, the cutting edge 52 of the tool 12 may be aligned with the hairline of the gauge member 23, and the tool thereafter rotated as indicated in Figure 7 to bring the back-off surface 11 into contact with the gauging contact face 45. Thus, it will readily be seen that the scale on the surface of the bed 20 may be employed to determine the radial rotation, and therefore may be scaled to read directly in degrees and portions of degrees to ascertain the clearance angle of the back-off surface 11. In each instance, the contact between the tool and the gauge surface may be observed through the eye piece 38 in order to assure measurement within close limits.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

I claim as the invention:

A gauge for measuring the clearance angle between a radius line extending through a spiral cutting edge and a back-off surface of a rotatable tool, said gauge comprising, a base providing an axis line and a radius line transversely intersecting said axis line, said base having a cylindrical opening concentric with said axis line, a carriage movable along said radius line on said base towards and away from said axis line and the cylindrical opening, a gauge member pivoted for angular positioning on said carriage and pivotally positionable in at least a first and a second position relative to said radius line, said gauge member providing a straight edge line extending at an angle to said axis line and also providing a sight line transversely bisecting said straight edge line, said gauge member when in said first position positioning said sight line in a common plane with said radius line and said axis line, said gauge member when pivoted to the second position positioning said sight line outside of said common plane, a tool mount tube rotatably and removably slidable in said cylindrical opening with the axis of the tool mount tube coextensive of said axis line to hold a spiral edged cutting tool concentrically slip fitted therein and with a cutting edge close to and at a spaced distance from said straight edge line and in sight extending alignment with said sight line when the sight line is in said common plane, said carriage and said base having an interassociated rack and gear operable to move the carriage towards the axis line when the gauge member is pivoted to the second position with the said edge line close to and parallel to the back-off surface of the tool and with the sight line out of said common plane and at an angle to the first position directly representing the clearance angle of the tool.

CARL G. GASE.

References Cited in the file of this patent

UNITED STATES PATENTS

| Number | Name | Date |
|---|---|---|
| 679,779 | Pierpont | Aug. 6, 1901 |
| 1,357,753 | Webster | Nov. 2, 1920 |
| 1,467,403 | Toomey | Sept. 11, 1923 |
| 1,489,372 | Steinle | Apr. 8, 1924 |
| 1,553,878 | Romig | Sept. 15, 1925 |
| 1,588,963 | Harter | June 15, 1926 |
| 1,687,649 | Gillett | Oct. 16, 1928 |
| 2,324,476 | Becker | July 20, 1943 |
| 2,368,579 | Spedding | Jan. 30, 1945 |
| 2,400,498 | Geissbuehler | Jan. 30, 1945 |

FOREIGN PATENTS

| Number | Country | Date |
|---|---|---|
| 874,679 | France | May 18, 1942 |
| 875,014 | France | June 1, 1942 |
| 876,855 | France | Aug. 24, 1942 |
| 908,572 | France | Oct. 1, 1945 |